United States Patent
Sheker et al.

(10) Patent No.: US 9,770,722 B1
(45) Date of Patent: Sep. 26, 2017

(54) LOW HEADLOSS FEED DEVICES AND CONTROL METHODS FOR TRAY-TYPE VORTEX GRIT REMOVAL SYSTEMS

(71) Applicant: Envirodyne Systems Inc., Camp Hill, PA (US)

(72) Inventors: Robert E. Sheker, Camp Hill, PA (US); Roy Shanafelter, Lewisberry, PA (US); Eric Alan Bushey, York Haven, PA (US)

(73) Assignee: Envirodyne Systems Inc., Camp Hill, PA (US)

( * ) Notice: Subject to any disclaimer, the term of this patent is extended or adjusted under 35 U.S.C. 154(b) by 0 days.

(21) Appl. No.: 15/161,736

(22) Filed: May 23, 2016

(51) Int. Cl.
*B01D 21/26* (2006.01)
*B01D 21/30* (2006.01)
(Continued)

(52) U.S. Cl.
CPC ............ *B04C 5/04* (2013.01); *B01D 21/0024* (2013.01); *B01D 21/0045* (2013.01);
(Continued)

(58) Field of Classification Search
CPC ..... B04C 5/04; B04C 5/103; B04C 2003/003; B04C 2003/006; B04C 3/06; C02F 1/385; C02F 1/006; C02F 2301/026; C02F 2303/24; C02F 2209/40; B01D 21/267; B01D 21/00; B01D 21/0003; B01D 21/0024; B01D 21/0042; B01D 21/0045; B01D 21/0051; B01D 21/02; B01D 21/24; B01D 21/2405; B01D 21/2411; B01D 21/2416; B01D 21/0063; B01D 21/0093; B01D 21/26; B01D 21/2427; B01D 19/0057; B03B 5/28; B03B 5/32; B03B 5/34; B03B 5/36; B03B 5/38; B03B 2005/405
(Continued)

(56) References Cited

U.S. PATENT DOCUMENTS 3,415,379 A * 12/1968 Thayer .................. C02F 3/1247
210/195.1
3,879,296 A * 4/1975 Schneider .............. B01D 21/10
210/512.1
(Continued)

OTHER PUBLICATIONS

Robert Y.G. Andoh, "Vortex Separators Provide Various Options in Grit Removal", Water World, vol. 24, Issue 9, 2009.

*Primary Examiner* — Nam Nguyen
*Assistant Examiner* — Julia Wun
(74) *Attorney, Agent, or Firm* — Wendy W. Koba

(57) ABSTRACT

An inlet arrangement for a tray-based grit removal system utilizes a set of separate inlet hoses to connect the vertical stack of trays to a horizontally-disposed inlet chute, thus eliminating the inlet duct utilized in prior art configurations. Each hose is configured to have about the same length and diameter, providing an essentially uniform influent pressure at the input to each tray. The hoses are directly connected between the trays and the inlet chute, where each tray may be formed to include a hose coupler of the same diameter as the hose. The inlet chute may take the form of a trough or tube (or other suitable geometry), with the plurality of hoses all terminating along a common, horizontal output face of the chute.

19 Claims, 8 Drawing Sheets

(51) Int. Cl.
  *C02F 1/38* (2006.01)
  *B04C 3/04* (2006.01)
  *B04C 5/04* (2006.01)
  *B01D 21/24* (2006.01)
  *B01D 21/00* (2006.01)
  *B03B 5/28* (2006.01)

(52) U.S. Cl.
  CPC ..... *B01D 21/0051* (2013.01); *B01D 21/2405* (2013.01); *B01D 21/2411* (2013.01); *B01D 21/26* (2013.01); *B01D 21/267* (2013.01); *B03B 5/28* (2013.01); *C02F 1/385* (2013.01); *C02F 2209/40* (2013.01); *C02F 2301/026* (2013.01)

(58) Field of Classification Search
  USPC .... 210/512.1, 787, 788, 800, 801, 802, 804, 210/519, 521, 137; 209/12.1, 725, 734
  See application file for complete search history.

(56) References Cited

U.S. PATENT DOCUMENTS

| | | | | |
|---|---|---|---|---|
| 4,652,363 | A | * | 3/1987 | Miller ................ B04C 5/02 209/734 |
| 5,389,250 | A | * | 2/1995 | Wood ................ B01D 21/0003 210/194 |
| 6,645,382 | B1 | | 11/2003 | Wilson |
| 6,852,239 | B2 | | 2/2005 | Wilson |
| 8,342,338 | B2 | | 1/2013 | Andoh et al. |
| 8,715,511 | B2 | | 5/2014 | Beliveau et al. |

* cited by examiner

LOW HEADLOSS FEED DEVICES AND CONTROL METHODS FOR TRAY-TYPE VORTEX GRIT REMOVAL SYSTEMS

TECHNICAL FIELD

The present invention relates to wastewater treatment and, more particularly, to an inlet configuration particularly designed to improve grit removal efficiency and reduce headloss in tray-type vortex grit removal systems.

BACKGROUND OF THE INVENTION

The need to remove grit from wastewater is a well-known concern. The grit takes the form of minute particles that, if not removed, interferes with the performance of downstream machinery where the grit may collect. In particular, the grit may lead to premature failure of components, accelerated wear, etc. The industry has used various arrangements over the years to remove as much grit as possible from wastewater at its initial introduction to a treatment facility. Depending on local conditions, the grit may vary in size (as well as composition), ranging from coarse grit on the order of about 300 microns down to fine grit typically on the order of about 100 microns.

Of the various types of grit removal systems, one exemplary type is a vortex-based configuration, where the influent is introduced in a tangential direction around the top periphery of a funnel-like element (referred to hereinafter as a "frusto-conical tray", or simply "tray"). The vortex created by the circulating fluid causes the grit particulate to be directed to the sides of the tray, with the grit-free fluid spun outward and away from funnel. U.S. Pat. No. 6,881,350 issued to G. E. Wilson illustrates an exemplary vortex type of grit removal system, using a stacked set of frusto-conical trays, with the influent introduced in parallel to the vertical stack of trays, thus increasing the volume of fluid that is treated within a given space. While able to increase the number of trays used to remove grit, the pressure differential at the input to the various trays is problematic and results in non-uniform grit removal. U.S. Pat. No. 6,852,239 issued to G. E. Wilson describes an improved type of feed configuration for use in this tray-type of grit removal system, where the geometry of the inlet duct is modified to reduce headloss (where headloss is defined as the difference in pressure between two points in a hydraulic system, here as a result of elevation changes). The inlet duct described in the '239 patent is also formed to have a set of separate output nozzles, each vertically oriented and coupled to a separate tray.

While the modified inlet duct geometry may reduce the overall headloss, the vertical arrangement of the inlet duct results in uneven path lengths between the entrance of the system and each tray, presenting a varying pressure differential to each tray. As a result, short-circuiting of flow and grit loadings to each tray will occur.

SUMMARY OF THE INVENTION

The needs remaining in the prior art are addressed by the present invention, which relates to an inlet feed configuration particularly designed to improve grit removal efficiency and reduce headloss.

In particular, an exemplary embodiment of the present invention relates to an arrangement that uses a plurality of separate inlet hoses to connect the set of trays to the inlet chute, thus eliminating the inlet duct utilized in prior art configurations. In a preferred embodiment of the present invention, each hose is configured to have about the same length and diameter, providing an essentially uniform influent pressure at the input to each tray. The hoses are directly connected between the trays and the inlet chute, with the inlet chute disposed in a horizontal direction with the plurality of hoses terminating along a common horizontal surface of the chute. The inlet chute may take the form of a horizontally-disposed trough or tube (or other suitable geometry), with the plurality of hoses all terminating along a common, horizontal output face of the chute.

Inasmuch as each hose is coupled to a tray in a one-to-one relationship, as trays are added to (or removed from) a given system, the number of hoses may be quickly and easily changed accordingly.

The utilization of a horizontally-disposed inlet chute allows for a higher level of inlet process control than possible with prior art configurations using a vertically-oriented inlet duct. In combination with like-sized hoses, the use of a horizontal chute allows for an even distribution of influent across all trays, as well as providing a means of engaging/disengaging trays as flows increase/decrease. Indeed, various embodiments of the present invention may utilize specially-designed inlet chutes (sloped, gated, etc.) to further improve the uniformity of flow and further reduction of headloss. Various other gates, weirs, valves, plugs, etc. (either manual or automatic) may also be used with the inlet chute to control the introduction of influent to selected trays, further enhancing the performance of the horizontally-disposed inlet chute of the present invention.

One particular embodiment of the present invention takes the form of an intake arrangement for introducing influent into a tray-based grit removal apparatus formed of a plurality of N trays disposed in a vertical stack. The intake arrangement includes a plurality of N inlet hoses, each hose having a predetermined length L and diameter D, a plurality of N nozzles having a diameter D, each nozzle disposed to connect a first termination of an inlet hose to an associated tray in a one-to-one relationship and a horizontally-disposed inlet chute for receiving influent, the inlet chute including a plurality of horizontally-disposed apertures for connecting with the plurality of N inlet hoses at a second, opposing end termination of each inlet hose.

Other and further embodiments and advantages of the present invention will become apparent during the course of the following discussion and by reference to the accompanying drawings.

BRIEF DESCRIPTION OF THE DRAWINGS

Referring now to the drawings, where like numerals represent like parts in several views:

FIG. 5 is a simplified diagram of a tray stack, showing the inclusion of baffles within the stack;

DETAILED DESCRIPTION

Figure 1:
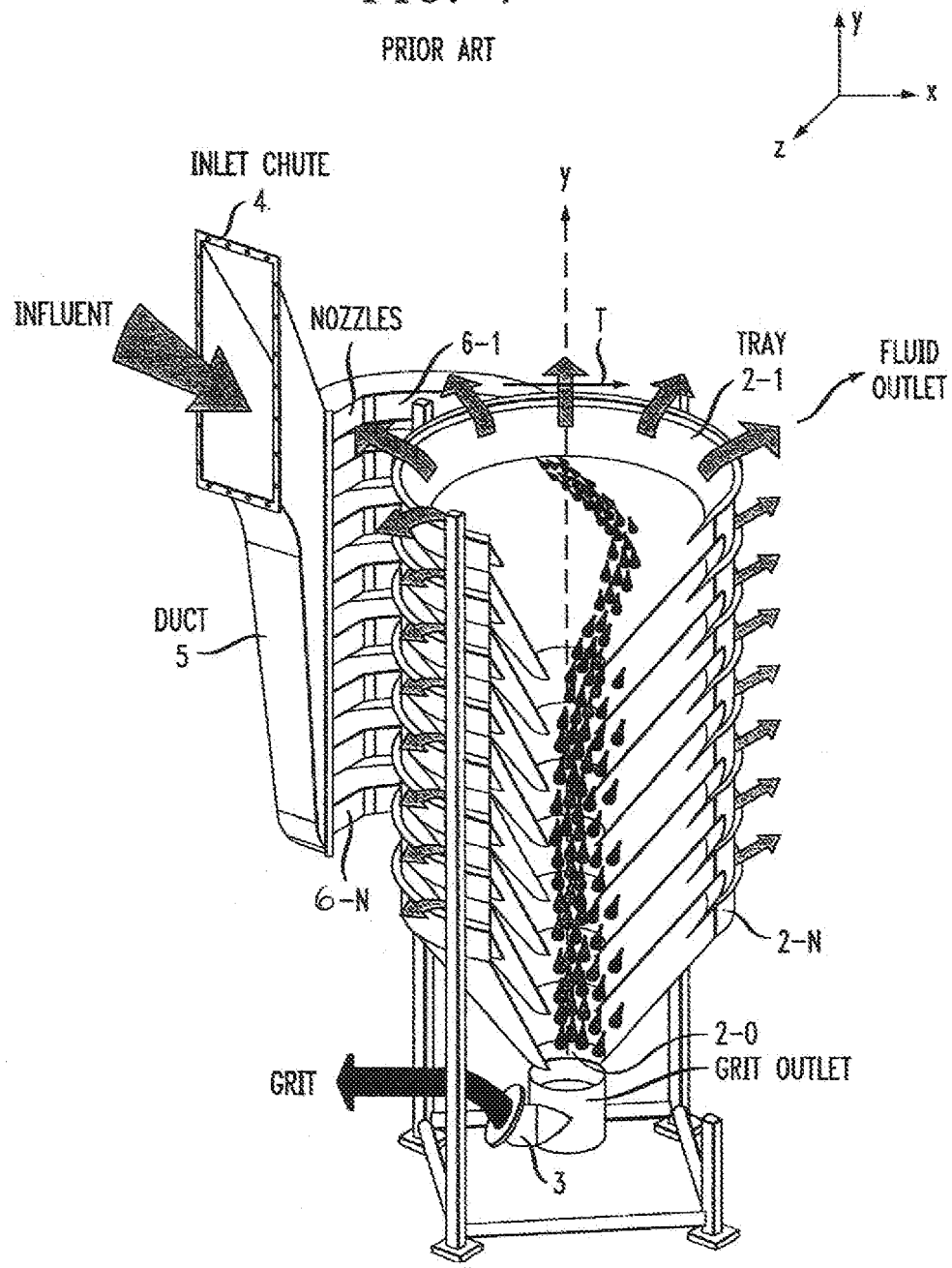
FIG. 1 is a depiction of a conventional prior art tray-based grit removal system.

FIG. 1 illustrates a conventional, prior art grit removal system 1. A brief review of the operation of such a system is considered to be important to best understanding the subject matter of the present invention, as fully described hereinafter in association with FIGS. 2-10.

Grit removal system 1 is illustrated in a partially cut-away view in FIG. 1, allowing for the geometry of the stack of trays and movement of the grit to be easily shown. System 1 is typically configured to include a plurality of frusto-conical trays 2 that are stacked in the vertical direction. The vertical direction is indicated as the y-axis in FIG. 1, and may also be considered as the direction along which the grit will move (downward) and ultimately exit system 1 through a grit outlet 3.

In operation, wastewater (hereinafter referred to as "influent") is introduced into system 1 through an inlet chute 4, where it fills a vertically-oriented inlet duct 5. In the particular configuration shown in FIG. 1, inlet duct 5 is formed to include a plurality of separate outlet nozzles 6 disposed in a vertical direction along a sidewall of duct 5, with each nozzle associated with separate a tray in a one-to-one relationship. That is, as shown, nozzle 6-1 is coupled to tray 2-1 (via a coupler 8-1), with this relationship continuing to the lowest tray, 2-N, where nozzle 6-N is coupled to tray 2-N.

The influent entering chute 4 continues to fill vertical inlet duct 5, which directs the influent across the plurality of trays 2 via nozzles 6. The orientation of couplers 8 with respect to trays 2 causes the influent to enter each tray along a path essentially tangential to an upper rim 9 of tray 2 (shown by the arrow "T" in FIG. 1). The influent will thus circulate around each tray 2, creating a vortex-type of motion, with the outlet fluid (hereinafter "effluent") spilling out over the tops of the trays (shown by the multiple arrows in FIG. 1). The grit will then tend to move downward, passing through openings 2-O in trays 2, where it is ultimately removed via grit outlet 3.

As mentioned above, a problem with this type of grit removal system is the relatively high headloss that exists along the interface between vertical inlet duct 5 and trays 2, related to the continuous flow of influent and the utilization of a vertical stack of trays. In the particular configuration shown in FIG. 1, the headloss is somewhat reduced by using the plurality of separate nozzles 6 and tapering the geometry of duct 5. This configuration creates a change in fluid pressure at each of the nozzles 6 that will somewhat compensate for the use of the vertical stack of trays 2. While this configuration is an improvement over the utilization of a conventional rectangular duct (vertically oriented) with a single outlet nozzle, there remains an unacceptable level of headloss across the stack of trays that results in non-uniform grit removal.

Figure 2:
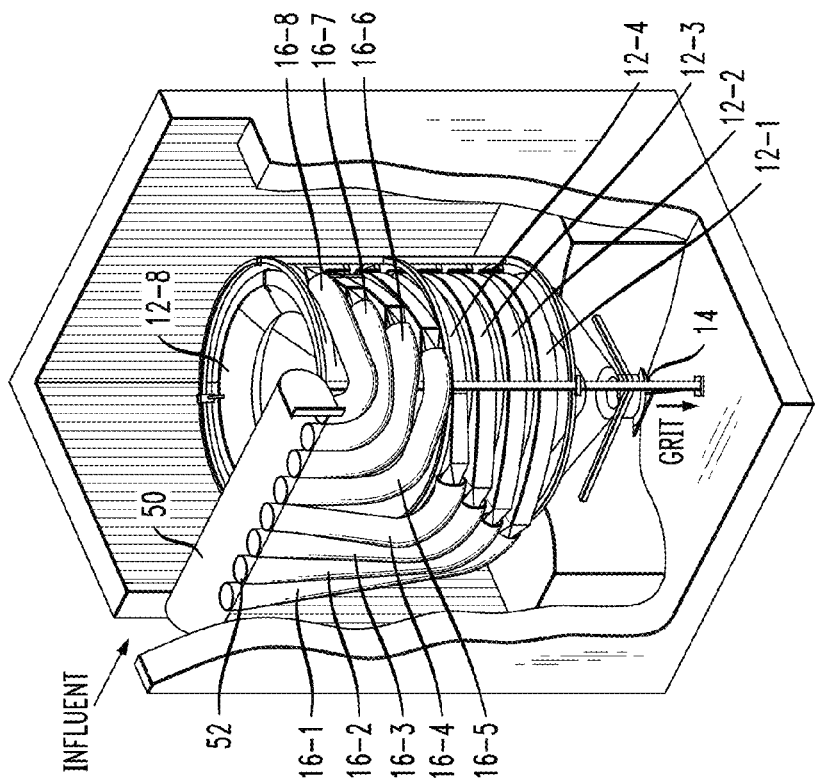
FIG. 2 is a cut-away, side isometric view of an exemplary grit removal system formed in accordance with the present invention.

FIG. 2 illustrates an exemplary grit removal system 10 formed in accordance with the present invention to address and overcome the remaining problems associated with the prior art. Grit removal system 10 is shown to include a plurality of stacked trays 12. Trays 12 are configured in an arrangement that is substantially the same as those of the prior art, each tray having a frusto-conical form that causes grit to accumulate and fall downward through a central aperture into a grit outlet 14. While not shown, it is contemplated that the trays may be formed to include any of the well-known type of baffles that have been found to improve the flow of influent and prevent re-incorporation of grit into the stream.

In accordance with the present invention, the inlet system comprises a plurality of separate hoses 16 that are used to directly connect each tray 12 to the incoming influent source (shown as entering at a horizontally-disposed inlet chute 18). In this particular embodiment, each hose is formed to exhibit the same (constant) diameter and each is formed of the same length, thus presenting the same, uniform flow conditions at the entrance of each tray 12. By virtue of this direct, one-to-one connection between the trays and the inlet chute, the duct (reservoir) component of prior art systems is eliminated. Additionally, the configuration of the present invention allows for the set of hoses to be presented in the horizontal direction at the inlet chute (in contrast to prior art use of vertically-oriented couplings between the inlet duct and the trays), allowing for better flow control and lower headloss.

The particular configuration illustrated in FIG. 2 includes a set of eight trays, denoted as 12-1, 12-2, . . . , 12-8, with hoses 16-1, 16-2, . . . , 16-8 connected as shown to each tray in a one-to-one manner. The opposing end of each hose 16 terminates at horizontal inlet chute 18 (the point in the system that receives the influent). In order to maintain the necessary vertical orientation of the tray stack while using a horizontally-oriented inlet chute and a set of interconnection hoses of the same length, the individual trays need to be somewhat rotated with respect to each other to present a staggered placement of nozzles, in order to insure a consistent path length between each tray nozzle 20 and inlet chute aperture 22.

Figure 3:
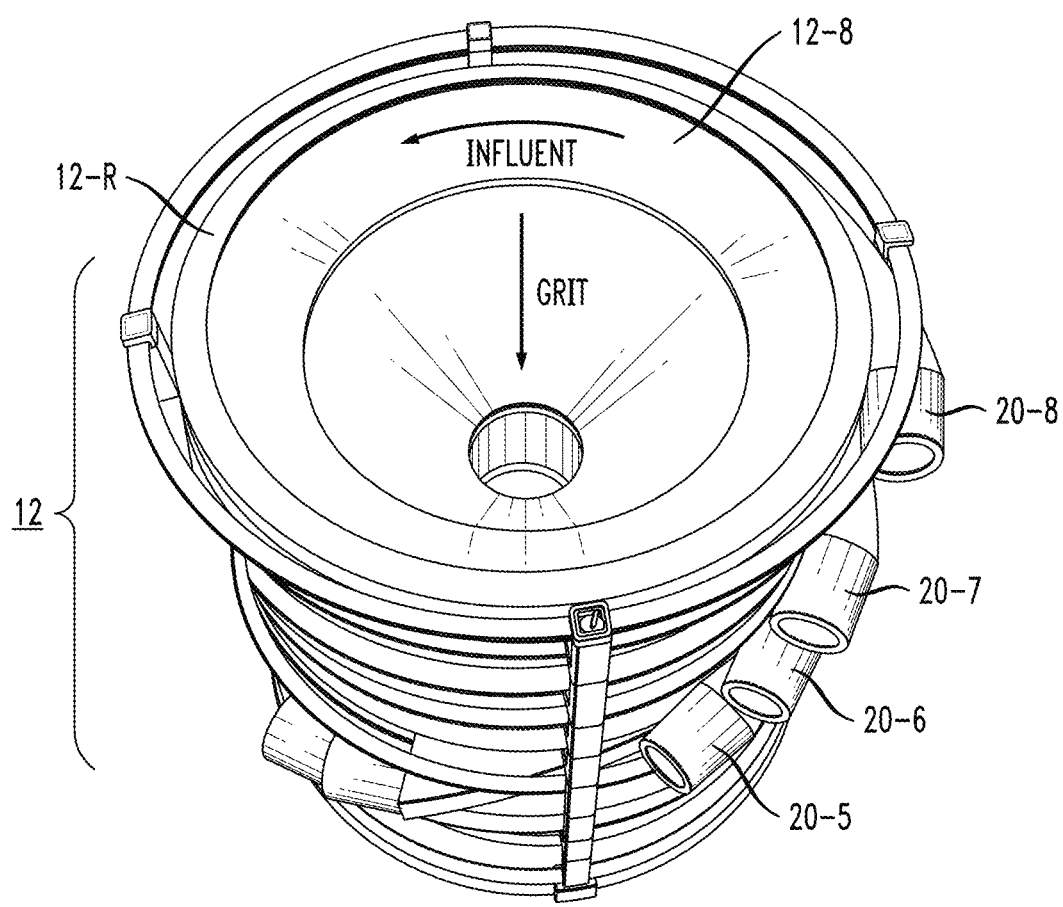
FIG. 3 is a top view of a set of stacked trays and associated nozzles for use in the grit removal system of the present invention, showing the staggered placement of the nozzles around the periphery of the stack.

FIG. 3 is a top view of an exemplary stack of trays, showing the staggered configuration required to maintain the same path length between each tray input nozzle 20 and its associated aperture 22 in horizontal inlet chute 18 (see FIG. 2). The displacement of one tray with respect to another is evident by the disposition of the various input nozzles 20, where nozzles 20-8, 20-7, 20-6 and 20-5 are specifically shown in this view in their staggered position around the periphery of the stack. One exemplary type of connection is shown for tray 12-8 and nozzle 20-8, where nozzle 20-8 is formed as an integral portion of tray 12-8. This should be considered as exemplary only; separate nozzles may be produced and attached to appropriate locations on the trays. As with the various prior art vortex-based grit removal systems, nozzles 20 are disposed such that the influent is introduced along a path that is somewhat tangential to the upper rim 12-R of tray 12. It is also clear from the configuration of FIG. 3 that each nozzle 20 is uniform in dimension. As described above, the staggered attachment locations around the circumference of the tray stack is a result of using hoses 16 (not shown) of uniform length, in accordance with the principles of the present invention.

Figure 4:
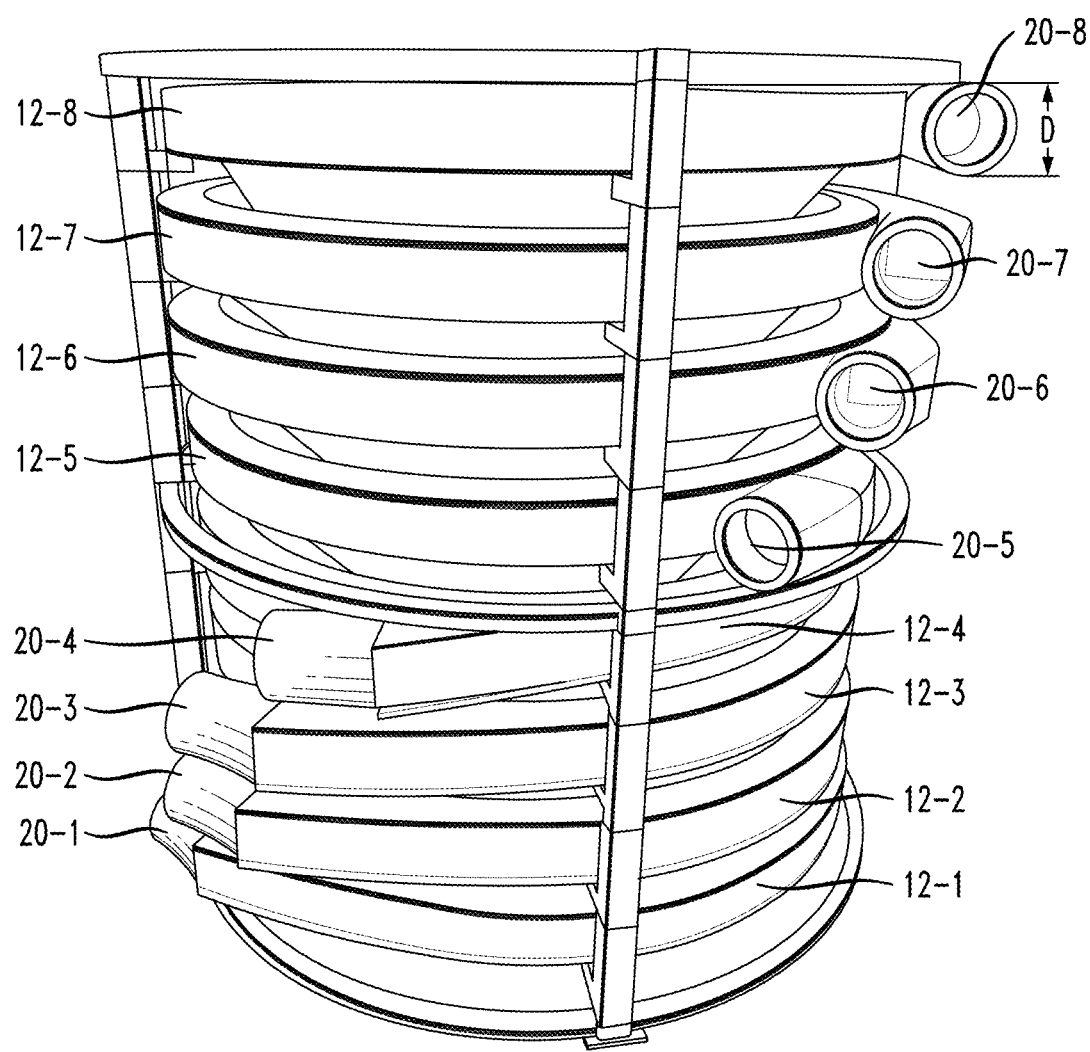
FIG. 4 is a side view of the stack of trays as shown in FIG. 3.

FIG. 4 is a side view of the same tray system as shown in FIG. 3. Here, the complete vertical stack of eight (for example) trays 12 is clearly shown. Also clearly shown in this view is each one of the separate nozzles 20, with nozzle 20-1 associated with tray 12-1, nozzle 20-2 with tray 12-2, etc., with nozzle 20-8 associated with tray 12-8. The staggered placement of nozzles 20 around the periphery of the stack of tracks 12 is evident in this view as well. Also shown in FIG. 4 is the diameter D of an exemplary nozzle 20, with each nozzle shown as having essentially the same diameter (this also being about the diameter of each hose 16). The uniform diameter of the plurality of nozzles, when used in conjunction with a plurality of inlet hoses of uniform length and diameter, thus provides a tray-based grit removal system with a substantially reduced headloss when compared to the prior art arrangements. As a result, the efficiency of the grit removal is substantially improved, without the need to modify the "footprint" of the removal system or impact the headloss requirements for the system.

Referring back to FIG. 2, horizontal inlet chute 18 is shown as comprising a trough geometry, with a plurality of apertures 22 formed along a bottom surface 24 of inlet chute 18. In operation, the influent enters system 10 as shown, where it is directed into inlet chute 18. The influent then drains into the plurality of apertures 22, passes through the plurality of hoses 16, and is introduced into the plurality of trays 12. By virtue of maintaining similar path lengths and dimensions between each tray 12 and inlet chute 18, each tray will receive about the same volume of influent, thus minimizing headloss.

It is to be understood that the geometry of inlet chute 18 as shown in FIG. 2 is exemplary only. In particular, FIG. 5 illustrates another embodiment of the present invention, using the same configuration of trays 12 and hoses 16, but in this case using a horizontal inlet tube 50 in place of horizontal trough inlet chute 18. In this configuration, inlet tube 50 is formed to include a plurality of apertures 52 (disposed along a horizontal direction of tube 50), with a separate hose 16 used to provide a connection between an aperture 52 and a tray 12. Various other inlet geometries, as well as tray configurations may be used.

Figure 6:
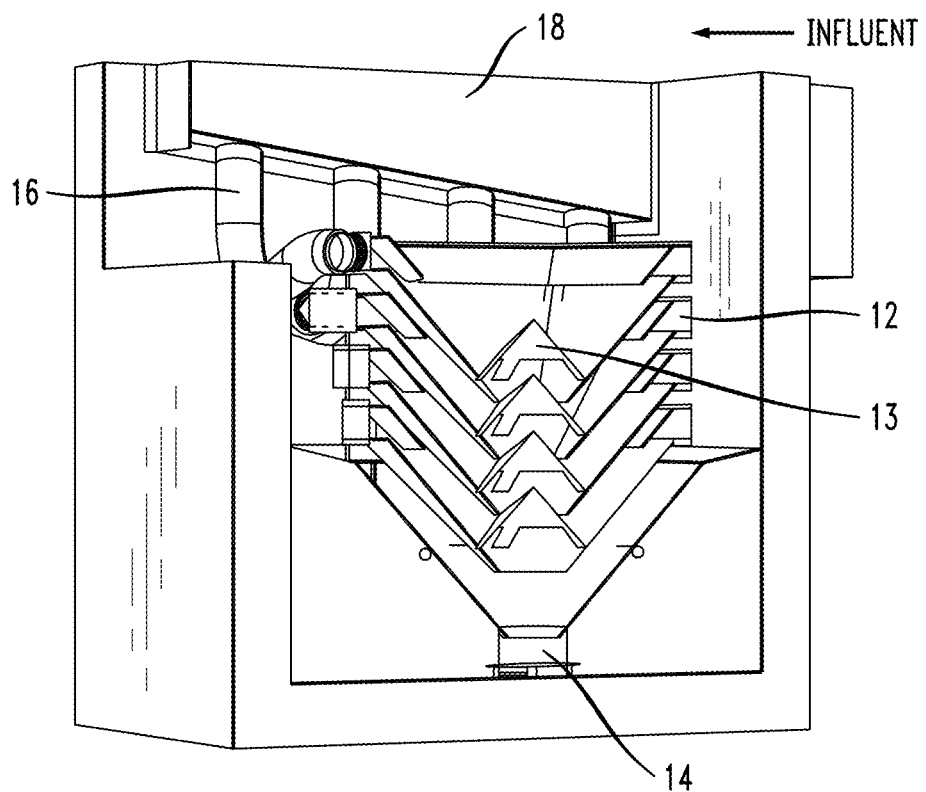
FIG. 6 is a cut-away, side view of an alternative embodiment of the present invention, in this case using a round tube inlet chute instead of the trough inlet chute as shown in the configuration of FIG. 2.

Indeed, FIG. 6 is a simplified side view of an exemplary vortex grit removal system where trays 12 are formed to include baffles 13, where baffles 13 are incorporated to restrict the upward flow of influent from one tray to another, minimizing the agitation of the grit in the fluid and improving the efficiency of the grit removal process.

Regardless of the inlet geometry and/or tray configuration, by virtue of using a plurality of separate inlet hoses, while maintaining a consistent cross-section and length of each duct, the influent pressure at the input to each tray will be substantially the same, overcoming the high headloss problem of the prior art.

Figure 7:
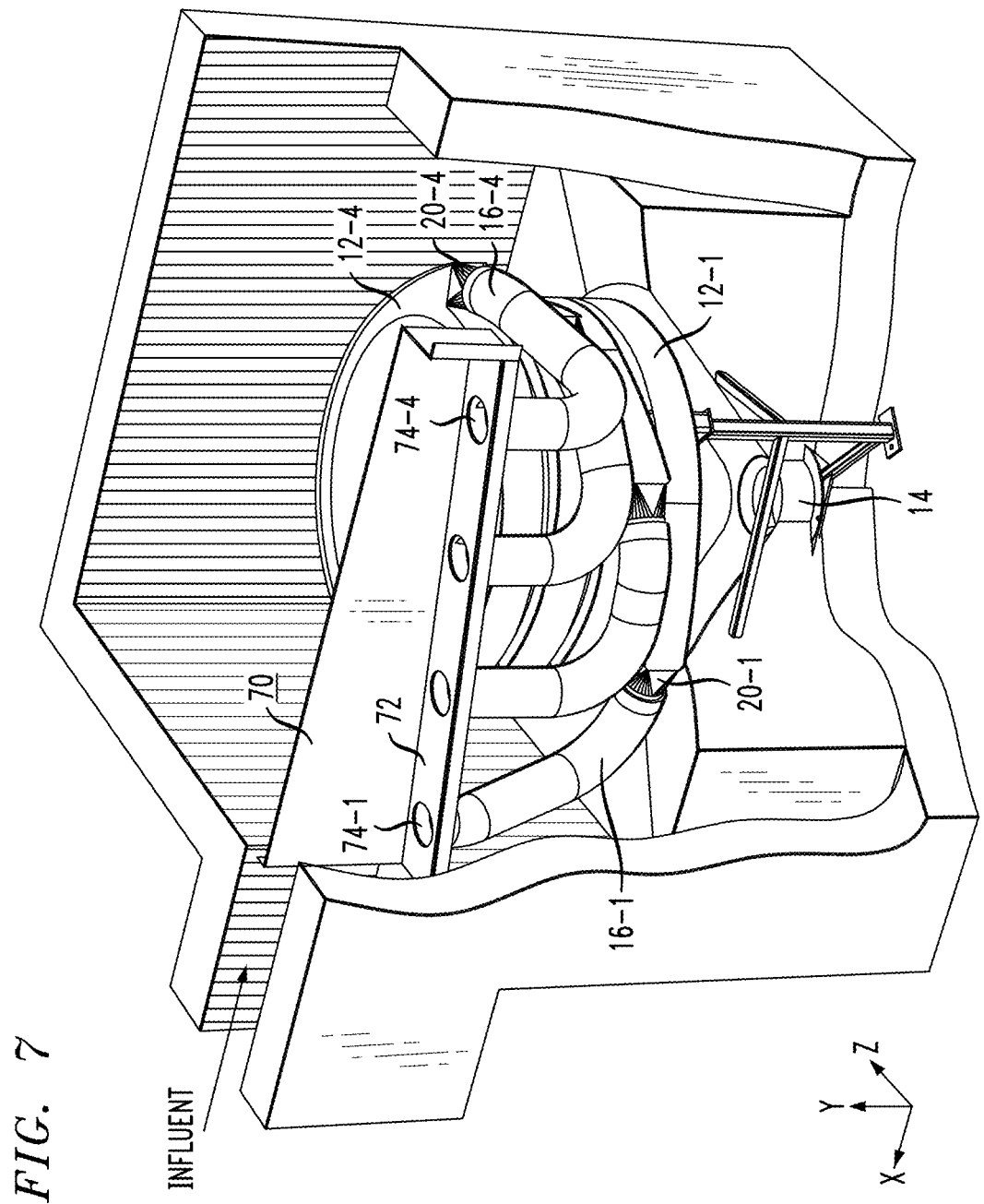
FIG. 7 is a simplified diagram illustrating an alternative inlet chute configuration, in this case exhibiting a upwardly-directed slope to control influent flow.

FIG. 7 is a cut-away view of another embodiment of the present invention. In this example, an inlet chute 70 is formed as a sloped trough, the slope extending upward along the horizontal (x-axis) direction of chute 70. In this simplified configuration, a set of four trays 12 is shown, with a separate hose 16 connecting each tray to inlet chute 70. In particular, an end termination of each hose 16 is coupled to a separate aperture 74 formed along bottom surface 72 of inlet chute 70.

By virtue of using this sloped configuration, the number of trays involved in grit removal will be a function of the volume of influent introduced into the system. That is, if the flow is relatively light, most of the influent will drain into the first aperture 74-1, and be directed into tray 12-1. As the influent flow increases, it will begin to fill more of inlet chute 70, with the upward slope of chute 70 controlling the rate at which the fluid will begin to enter the remaining apertures 74.

Figure 8:
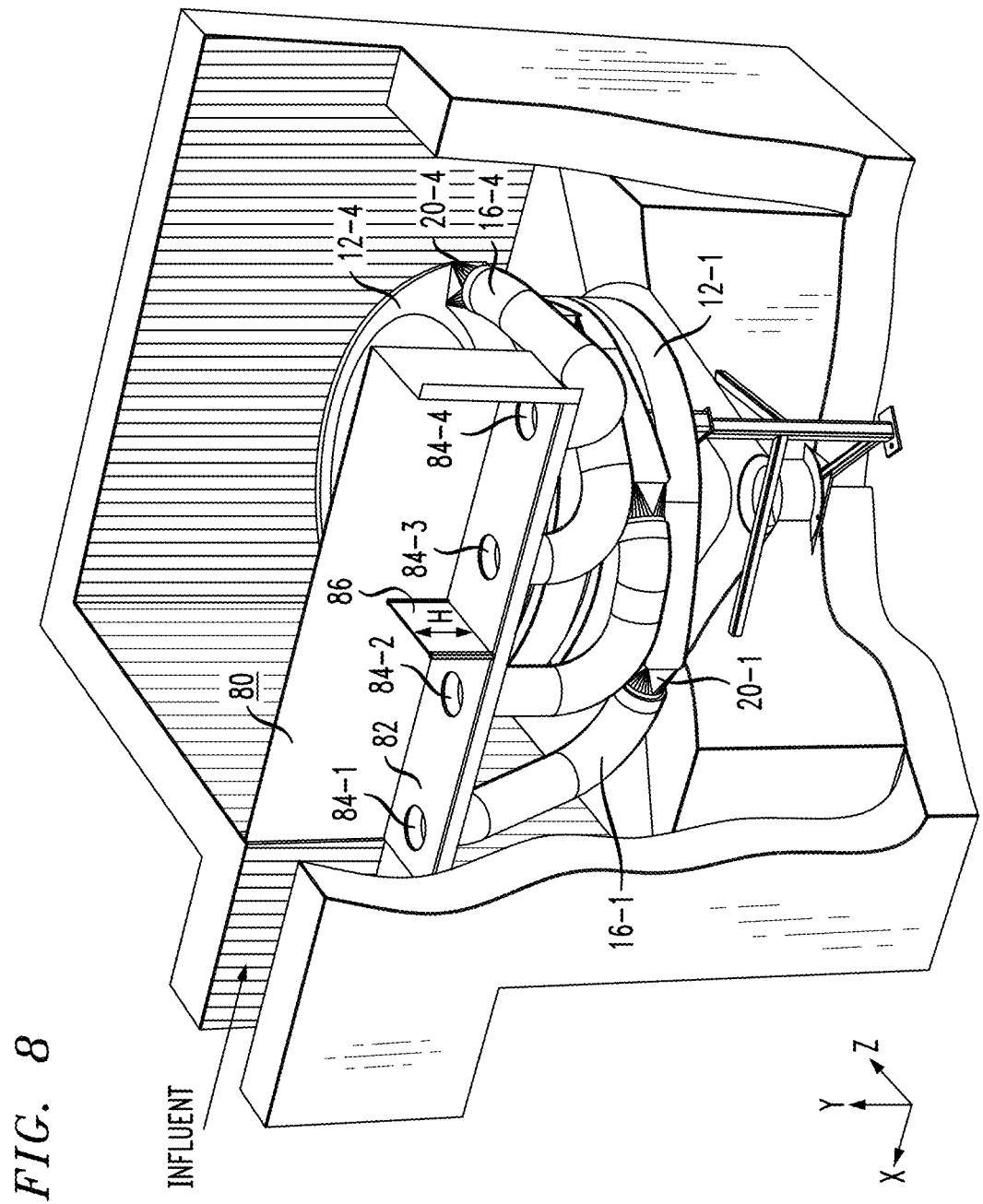
FIG. 8 is a simplified diagram of yet another inlet chute configuration, in this case including a stop gate for controlling influent flow.

Another configuration of a horizontal inlet chute is illustrated in the configuration of FIG. 8. Here, a horizontal inlet chute 80 maintains the linear form of horizontal trough inlet chute 18 shown in FIG. 2. Referring to FIG. 8, horizontal inlet chute 80 includes a plurality of apertures 84 formed along bottom surface 82, with each aperture 84 coupled to a separate hose 16, used to connect a separate one of the trays 12 to inlet chute 80. In accordance with this embodiment of the present invention, a higher level of inlet process control is achieved by including a stop gate 86 extending upward from bottom surface 82. The height "H" and location of stop gate 86 both contribute to the level of process control that is obtained. In particular, the height of stop gate 86 will control the influent flow volume at which the fluid will spill over and begin to enter apertures 84-3 and 84-4 (which stop gate 86 is positioned between apertures 84-2 and 84-3, as shown). Obviously, the location of stop gate 86 along the lateral extent of bottom surface 82 controls the number of apertures that are involved in the grit removal process before the flow spills over gate 86.

Figure 9:
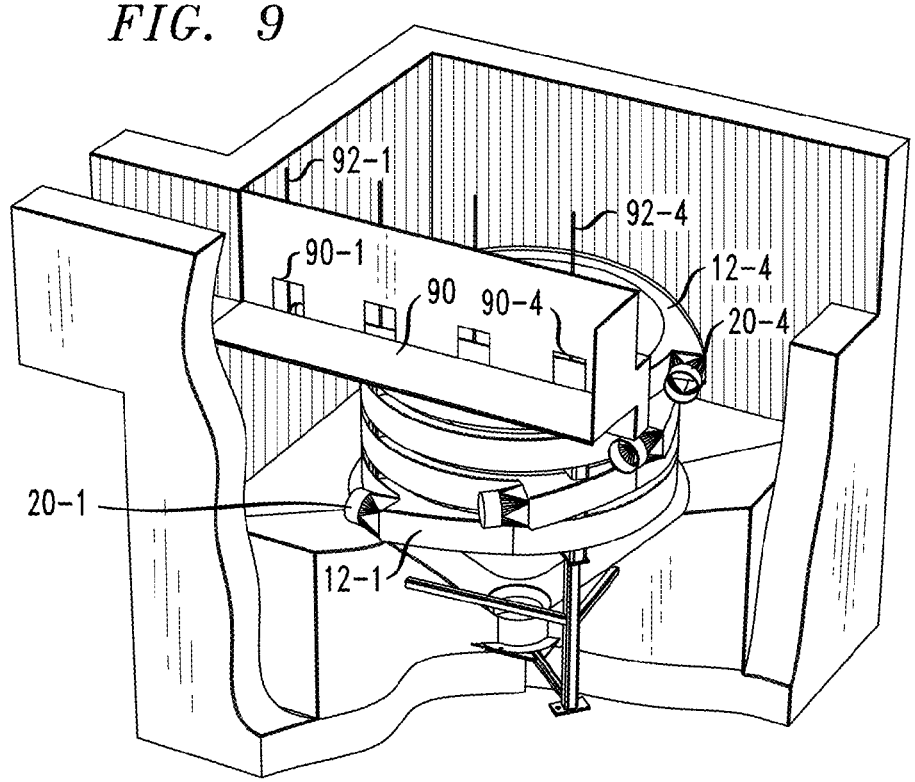
FIG. 9 is a simplified diagram of yet another inlet chute configuration, in this case including a plurality of weir gates for controlling influent flow.
Figure 10:
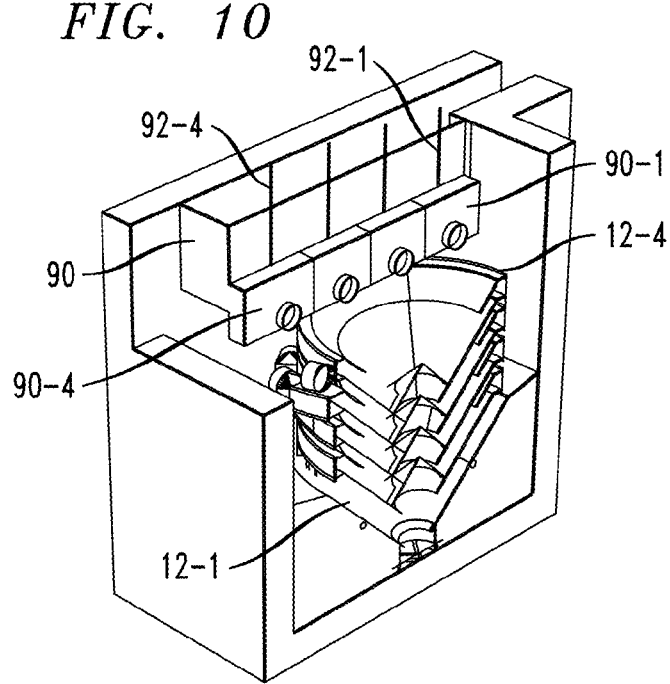
FIG. 10 is a cut-away rear view of the weir gate configuration of FIG. 9.

FIG. 9 shows yet another embodiment of the present invention, where in this case a plurality of weir gates 90 is used as the inlet chute, controlling the introduction of influent to the trays. FIG. 10 is a cut-away rear view of this configuration, showing the particulars of the individual gates. For the sake of clarity, the interconnecting hoses are not shown in FIGS. 9 and 10. In this particular configuration, the plurality of weir gates 90 is formed along a sidewall surface 94 (in the same horizontal displacement of the various embodiments discussed above). Each separate weir gate 90-1 through 90-4 is controlled in the well-known manner with a set of gate controllers 92-1 through 92-4. In particular, the set of gates is controlled such that weir gate 90-1 is "opened" as soon as influent is introduced into the system. As a larger volume of fluid is introduced, more of the gates are opened (with each gate also being controlled to be able to transition from closed to partially opened (to a controlled amount), and ultimately to completely open).

While not explicitly illustrated, it is to be understood that various manual or automatic systems may be used to control the number of trays involved in grit removal. For example, valves, plugs, gates, weirs, and the like may be used in conjunction with the inlet chute to control the introduction of the influent to the trays under a variety of different operating conditions, providing the ability to adjust the number of trays used at different points in time as needed.

What is claimed is:

1. An intake arrangement for introducing influent into a tray-based grit removal apparatus formed of a plurality of N trays disposed in a vertical stack, the intake arrangement comprising a plurality of N inlet hoses, each inlet hose having a same predetermined length L and a same predetermined diameter D;

a plurality of N nozzles, each nozzle having the same predetermined diameter D, each nozzle disposed in a staggered formation to connect a first termination of an associated inlet hose of the plurality of N inlet hoses to an associated tray of the plurality of N trays in a one-to-one relationship; and a horizontally-disposed inlet chute for receiving influent, the inlet chute including a plurality of horizontally-disposed apertures for connecting with the plurality of N inlet hoses in a one-to-one relationship, with the connections at a second, opposing end termination of each inlet hose.

2. The intake arrangement as defined in claim 1 wherein the plurality of N inlet hoses comprises a plurality of flexible hose sections, each hose section having the same predetermined diameter D and the same predetermined length L.

3. The intake arrangement as defined in claim 1 wherein each nozzle is formed as an integral portion of the associated tray.

4. The intake arrangement as defined in claim 1 wherein each nozzle is formed as a separate component and is connected between an inlet hose of the plurality of N inlet hoses and a tray of the plurality of N trays, providing a consistent, same predetermined diameter D along an influent flow path.

5. The intake arrangement as defined in claim 1 wherein each nozzle is integrated as the first end termination of an associated inlet hose of the plurality of N inlet hoses.

6. The intake arrangement as defined in claim 1 wherein the horizontally-disposed inlet chute exhibits a trough-shaped geometry, with the plurality of apertures disposed across a common surface of the trough-shaped inlet chute.

7. The intake arrangement as defined in claim 1 wherein the horizontally-disposed inlet chute exhibits a pipe-shaped geometry, with the plurality of apertures disposed across a bottom region of the pipe-shaped inlet chute.

8. The intake arrangement as defined in claim 1 wherein the horizontally-disposed inlet chute further comprises a control system for selecting a predetermined number of trays from the plurality of N trays which are utilized in grit removal.

9. The intake arrangement as defined in claim 8 wherein the control system comprises a stop gate disposed between adjacent apertures in the inlet chute, a predetermined position and a predetermined height of the stop gate designed to control a flow of influent along the inlet chute.

10. The intake arrangement as defined in claim 1 wherein the horizontally-disposed inlet chute takes the form of a sloped inlet chute, the inlet chute sloped upward to control a number of apertures into which the influent enters.

11. The intake arrangement as defined in claim 8 wherein the control system comprises a plurality of weir gates.

12. The intake arrangement as defined in claim 1 wherein each nozzle is disposed to introduce the influent along a tangential flow direction with respect to its associated tray from the plurality of N trays.

13. A vortex-based system for removing grit from an influent fluid flow, the system comprising an intake arrangement for accepting the influent fluid flow;

a plurality of N frusto-conical trays disposed in a vertical stack and coupled to the intake arrangement for receiving the influent fluid flow, a geometry of the frusto-conical trays causing grit to accumulate and fall downward through a central aperture of the vertical stack;

a grit outlet disposed below the central aperture of the vertical stack for collecting the grit; and an outlet arrangement for directing grit-free effluent away from the system, wherein the intake arrangement comprises a plurality of N inlet hoses, each hose having a same predetermined length L and a same predetermined diameter D;

a plurality of N nozzles, each nozzle having the predetermined diameter D, each nozzle disposed in a staggered formation to connect a first termination of an associated inlet hose from the plurality of N inlet hoses to an associated tray from the plurality of N trays in a one-to-one relationship; and a horizontally-disposed inlet chute for receiving the influent fluid flow, the inlet chute including a plurality of horizontally-disposed apertures for connecting with the plurality of N inlet hoses at a second, opposing end termination of each inlet hose.

14. The system as defined in claim 13 wherein the plurality of frusto-conical trays further comprises a baffle arrangement for preventing upward movement of influent and agitation of grit.

15. The system as defined in claim 13 wherein the horizontally-disposed inlet chute exhibits a trough-shaped geometry, with the plurality of apertures disposed across a bottom surface of the trough-shaped inlet chute.

16. The system as defined in claim 13 wherein the horizontally-disposed inlet chute further comprises a control system for selecting a predetermined number of trays from the plurality of N trays which are utilized in grit removal.

17. The system as defined in claim 16 wherein the control system comprises a stop gate disposed between adjacent apertures in the inlet chute, a predetermined position and a predetermined height of the stop gate designed to control a flow of influent along the inlet chute.

18. The system as defined in claim 13 wherein the horizontally-disposed inlet chute takes the form of a sloped inlet chute, the inlet chute sloped upward to control a number of apertures into which the influent enters.

19. The system as defined in claim 16 wherein the control system comprises a plurality of weir gates.

* * * * *